Aug. 11, 1931. J. O. HUXFORD 1,818,398
HACK
Filed Nov. 26, 1928

Inventor
J. O. Huxford
By Philip A. Tyrrell
Attorney

Patented Aug. 11, 1931

1,818,398

UNITED STATES PATENT OFFICE

JERE O. HUXFORD, OF PERRY, FLORIDA

HACK

Application filed November 26, 1928. Serial No. 321,945.

The invention relates to hacks of the type used for forming bill streaks in trees for the production of naval stores, and has for its object to provide a hack constructed in a manner whereby a bill streak can not be formed over a predetermined depth, thereby preventing loss of material, for instance when the tree is formed into lumber and obviating what is known as dry spaces.

A further object is to provide a hack having a semicircular shaped cutting bill carried by the shank and the wing of the tool, and offset from the edge of the shank, whereby during the cutting of the bill streak if the cutting bill enters the wood beyond a predetermined depth, said shank will engage the wood and prevent the continued cutting of the bill streak at an excessive depth.

A further object is to provide a hack comprising an elongated body member terminating in a substantially right angularly disposed shank which shank terminates in a semicircular shaped cutting bill having its forward end spaced from the edge of the shank and sharpened, said forward edge of the shank being free of cutting edge.

With the above and other objects in view the invention resides in the combination and arrangement of parts as hereinafter set forth, shown in the drawings, described and claimed, it being understod that changes in the precise embodiment of the invention may be made within the scope of what is claimed without departing from the spirit of the invention.

Figure 1:
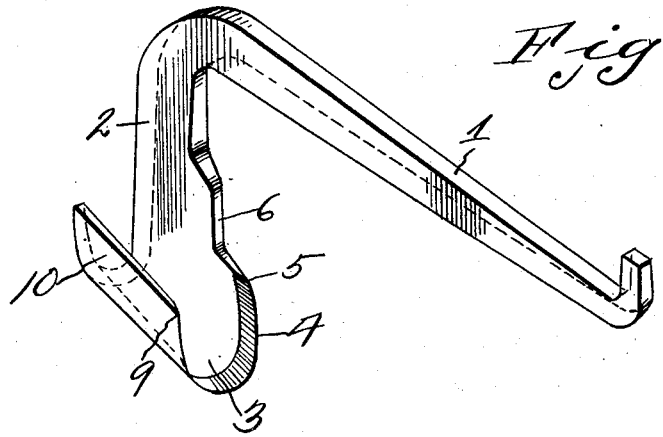
Figure 1 is a perspective view of the hack.
Figure 2:
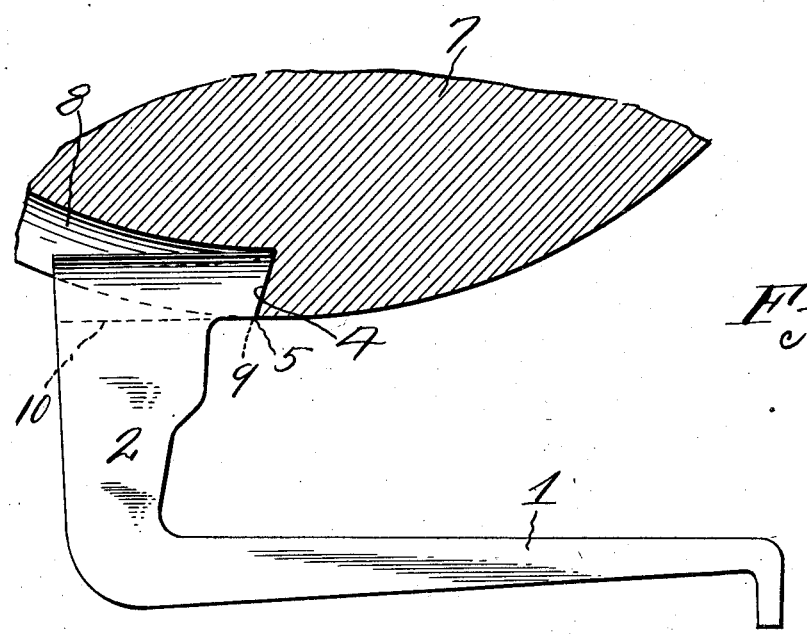
Figure 2 is a horizontal sectional view through a portion of a tree showing the hack in position for use.

Referring to the drawings, the numeral 1 designates the elongated body of the hack to which a handle may be attached in the usual way, and 2 the right angularly disposed shank carried by one end of the body member. The outer end of the shank 2 terminates in a bill streak cutter 3 which is substantially segmentally shaped in vertical transverse cross section as clearly shown in Figure 1, and is disposed preferably in parallel relation to the body 1.

The bill streak cutter 3 has one of its ends provided with a cutting edge 4, and which cutting edge terminates at one side at 5 in the plane of the shank 2 where the portion 6 thereof will engage the wood of the tree 7 if the bill streak cutter 3 is forced into the tree a depth greater than the depth of the bill streak cutter, therefore it will be seen that the cutting of the bill streak 8 beyond a predetermined depth is prevented, thereby preventing waste of timber, especially when the trees are afterwards used for lumber, and by limiting the depth of the bill streak, it is obvious that dry spaces are eliminated. The end 9 of the cutting edge 4 is in substantially the same plane as the end 5 of the cutting edge, and the wing 10 of the bill streak cutter terminates in the same plane, therefore it will be seen that the wing cutting edge is limited as to position and size to conform with the cutting edge of the shank 2, thereby preventing a semicircular cutting edge positioned whereby the depth of the bill streak cut 8 is limited, and if said cut is exceeded the hack will be rendered inoperative incident to the particular relation of the shank edge 6, and the cutting edge 4.

From the above it will be seen that a hack is provided for use in forming bill streaks in trees for the production of naval stores, which hack is simple in construction, formed from a single piece of material, and is provided with a semicircular cutting edge offset to one side of the handle in a position whereby it will only be possible to form a bill streak of a predetermined depth. It will also be seen that a relatively short wing 10 is used thereby limiting the depth of cut on the wing side of the tool.

The invention having been set forth what is claimed as new and useful is:—

A bill streak cutter comprising a body member, an angularly disposed shank carried by the body member, said shank terminating in a bill streak cutter U-shaped in vertical transverse cross section, one end of said bill streak cutter terminating beyond one edge of the shank and in a cutting edge, said last named edge of the shank having step shaped blunt profile forming means whereby the cutting of a bill streak a depth greater than the depth of the cutting edge is prevented.

In testimony whereof I hereunto affix my signature.

JERE O. HUXFORD.